May 23, 1950     K. F. SCHREIER ET AL     2,509,172
FRACTIONATING COLUMN OR THE LIKE
Filed May 20, 1946
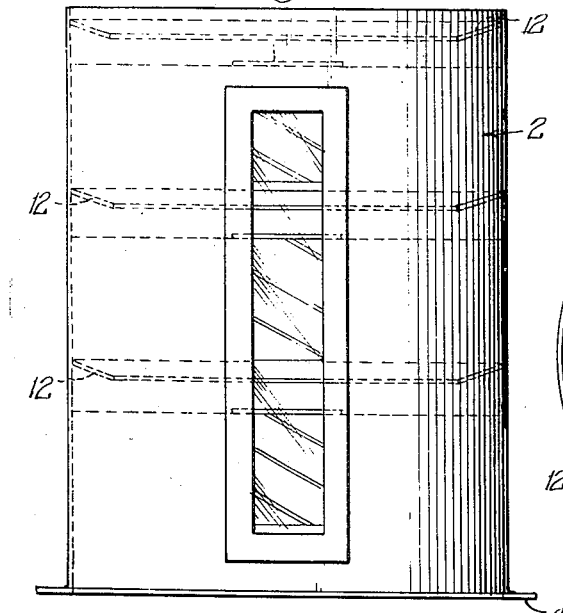
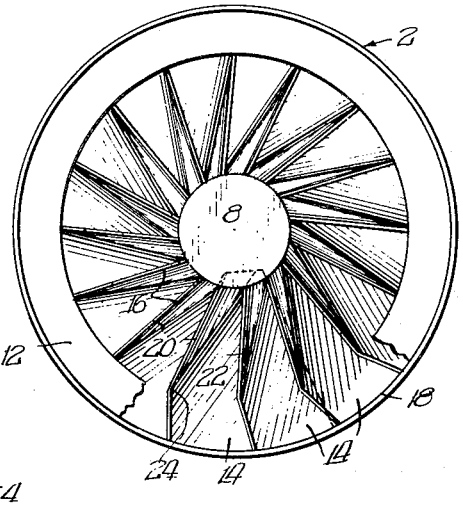
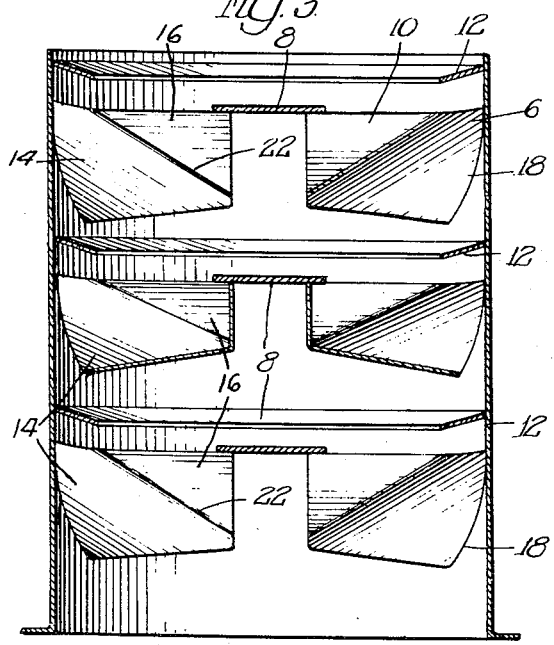
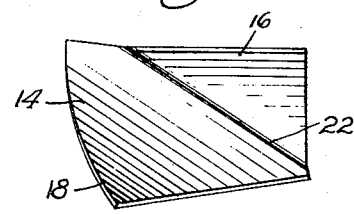
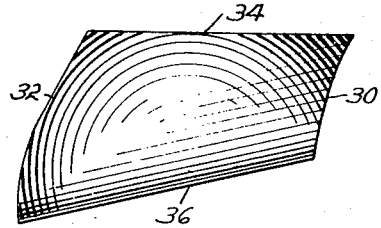
INVENTORS:
Konrad F. Schreier,
BY Ben Bartolucci,
Wilkinson, Huxley, Byron & Knight
Attys Patented May 23, 1950

2,509,172

UNITED STATES PATENT OFFICE 2,509,172

FRACTIONATING COLUMN OR THE LIKE

Konrad F. Schreier, Lake Forest, and
Ben Bartolucci, Chicago, Ill.

Application May 20, 1946, Serial No. 671,048

8 Claims. (Cl. 261—79)

The present invention relates to fractionating columns or the like.

The present invention has to do with fractionating columns of the general type shown in the Schneible Patent No. 1,366,956. Without in any way detracting from the improvement made by Schneible in 1919, nevertheless, the fractionating column as disclosed therein has certain inherent defects and limitations which throughout the years have resulted in various experiments to provide a structure which operates in an improved manner and with increased capacity. Columns of the type shown in that patent are definitely limited in their operating capacity to the area of the circular opening in the baffle ring and the operating capacity is controlled by the said baffle ring opening regardless of the diameter thereof. It has also been found that such devices have a tendency to "channel," that is to say, there is a tendency for the descending liquid and rising vapors or gases to take definite lines of travel as segregated bodies without intimate intermixing of one with the other, which is necessary to secure high operating efficiency.

It is, therefore, an object of the present invention to provide a novel fractionating column or the like in which the capacity is greatly increased over that secured by prior art structures and in which the improvements effectively cause a more intimate inter-action between the descending liquid and rising vapors and gases, thus preventing channeling as above described to further contribute to the efficiency of the device.

The present invention is directed to the formation of a fractionating column or the like in which vane assemblies are provided in spaced relation to one another and in which the vanes are so disposed as to cause the vapors or gases rising in the column to flow in tortuous and circuitous paths centrifugally into the outer peripheral regions of the column, the said vane assemblies being associated with collars disposed adjacent the periphery thereof which causes such vapors or gases to be directed inwardly to break up the descending liquid into a fine spray, thus causing said liquids in spray form to move centripetally of the column in tortuous and circuitous paths.

The present invention also comprehends a device of the type immediately hereinabove set forth in which each of the vane assemblies is provided with a liquid dispersion member causing the said liquid to be thrown into contact with the inwardly directed vapors or gases.

Still another object of the present invention is to provide a vane assembly for fractionating columns or the like in which the vanes are so constructed and arranged as to prevent channeling of the descending liquid or rising vapors or gases when these movements of fluids take place simultaneously or separately.

Still a further object of the present invention is to provide a vane assembly for fractionating columns or the like in which the vanes are so constructed and arranged as to prevent congestion of either rising gases or vapors on the one hand and descending liquids on the other hand when these movements of fluids take place simultaneously or separately. This characteristic of congestion has been an inherent defect of open columns especially of the types as described in the aforesaid Schneible Patent No. 1,366,956. The present invention introduces "flexibility" by means of which a tremendous increase in rising vapors or gases and descending liquid may occur without impairing the action in the column as above set forth.

Another object within the purview of the present invention is to provide a fractionating column of the open type in which the capacity for vapors and gases and/or other liquids approximates the inlet capacity thereof.

Other objects, features, capabilities and advantages are comprehended by the invention, as will later appear and as are inherently possessed thereby.

Referring to the drawings:

Figure 1 is a view in elevation of a section for a fractionating column or the like embodying improvements made in accordance with the present invention;

Figure 2 is a top plan view of the device shown in Figure 1 of the drawings, with parts cut away to show certain details of construction more clearly;

Figure 3 is a longitudinal sectional view of the device shown in Figure 1 of the drawings;

Figure 4 is a view in perspective of an individual vane for the vane assemblies, and Figure 5 is a view in perspective of an alternative form of vane for the vane assemblies.

Referring now more in detail to the drawings, a device made in accordance with the present invention is shown as being constituted by one or more sections such as that identified by the reference numeral 2 in the drawings. The fractionating column or the like may comprise any desired number of such sections, each of which may be of cylindrical wall construction 3 as shown in the drawings. These sections may be secured together by abutting flanges 4 through which bolts extend to provide a unitary structure in which one or more of the sections may be readily removed or replaced as desired. In the drawings, section 2 is shown as having a lower flange 4 without a corresponding flange at the top. Any suitable closure member may be secured to the top and the same may be provided with means for introducing a liquid into the top of the column when such procedure is desirable, such for example as would be required where the column is used as a dust collector. It is also understood that under such conditions any suitable vents may be provided for the rising fluids.

As shown in the drawings, each of the sections is provided with three vane assemblies, such as 6, but it is of course understood that if desired, such section may be provided with any number of such vane assemblies.

Inasmuch as each of the vane assemblies is of like construction reference will be made to the upper-most assembly for the section, as shown in Figure 2 of the drawings. Each of these vane assemblies is characterized as including a centrally disposed circular liquid dispersion plate 8 and a plurality of vanes 10 of like construction. These vanes are disposed in angular spaced relation circumferentially of the liquid dispersion plate 8 and have their upper inner edge secured thereto as by means of welding or the like, the said blades being disposed in depending relation to the said plates and extending outwardly in edge abutting relation to the inner surface of the cylindrical wall 3. The outer edge of the said blades may be welded or otherwise secured to the said cylindrical wall.

Disposed in axially spaced relation to each of the vane assemblies is a collar 12 of annular formation having an outer diameter of such a size as to fit comfortably within the confines of the cylindrical wall 3 to provide a vapor proof joint, the said collar being inclined axially for a purpose to be hereinafter more fully disclosed.

Each of the said vanes in the illustrative embodiment of the invention is formed to provide two fluid directing surfaces 14 and 16 angularly disposed with respect to one another, the said surface 14 terminating at the curved outer edge 18 of the vane which is of such radius of curvature as to closely fit the curved surfaces of the cylindrical wall 3 when the blade is secured in operative position. As clearly apparent from Figures 2 and 3 of the drawings, the vane in operative position is so disposed that the upper marginal edge 20 is slightly disposed angularly with respect to a radial line through the center of the plate 8. It is also apparent that the blade is so assembled in the device that the fluid directing surface 14 extends outwardly beyond the fluid directing surface 16. The fluid directing surface 14 is of greater area than the fluid directing surface 16 and the intersection 22 of these surfaces extends from the inner marginal edge of the vane adjacent to the junction thereof with the lower marginal edge upwardly and outwardly and the same is angularly disposed both with respect to axial and radial planes passing therethrough. The fluid directing surfaces 14 and 16 are also angularly inclined with respect to said planes but the inclination of the surface 16 is at an angle greater than the angle of inclination of the fluid directing surface 14 to a radial plane or plane perpendicular to the axis of the column. I is also to be noted that the intersection 22 terminates at a point in the upper marginal edge of the vane identified by reference numeral 24 which is in substantially axial alignment with the inner circular edge of the annular collar 12. It is to be noted that adjacent vanes overlap each other to a substantial amount in order to define channelways for passage of vapors and gases, as well as liquids. It will be apparent from the above description that the vanes are characterized as being of trough-like formation wherein the trough is on the upper side of each of the vanes and is defined by surfaces of different pitch angle.

In the operation of the device, rising vapors or gases traverse the column in gyrating or cyclonic movements. The movement of the said vapors or gases is controlled primarily by the disposition of the fluid directing surface 14 which causes said vapors or gases to move outwardly toward the periphery of the vane assemblies and into contacting relation to the collars 12. Upon contact with the inclined under-surface of the collar 12, the said gases and vapors are caused to move inwardly and peripherally and into contact with the descending liquid to cause said liquid to be dispersed in the form of a spray in its downward movement through the column. The said liquid in the form of a uniformly dispersed phase moves centripetally toward the center of the vane assembly guided principally in its movement by the surface 16 and the surfaces adjacent the merging of the surfaces 14 and 16 at 22 so that the said liquid in its downward movement through any vane assembly is directed substantially onto the liquid dispensing plate 8 of the next successive lower vane assembly where the liquid is again acted upon by the rising vapors and gases deflected by the collar associated with the said next successive lower vane assembly, thus causing a repetition of the action above described at each successive vane assembly disposed in the fractionating column.

By virtue of the novel vane assemblies, applicants have been able to secure increased capacity and far superior efficiency to that secured in the prior art devices, as exemplified in the Schneible patent, and to prevent channeling which has characterized such prior art devices. The construction of these vane assemblies is such as to provide flexibility in operation whereby a tremendous increase in rising vapors or gases and descending liquid may occur without impairing the action in the column as heretofore described.

While the preferred form of the invention is shown in the drawings and is characterized by the particular type of vane structure as hereinbefore described, nevertheless, it is to be understood that this particular form has been used as being the most applicable commercially and from the standpoint of cheapness of construction, yet improved results may be secured by making each of the vanes in such a manner as to provide a compound curved fluid directing surface. Such alternative construction is shown in Figure 5 of the drawings. In such form of construction the blade is curved both longitudinally between the the inner and outer edges 30 and 32, respectively, as well as transversely between the upper and lower edges 34 and 36, respectively, to form a compound curved fluid directing surface. The vanes of this modification are also characterized by their trough-like formation having surfaces of different pitch angle. The operation and functioning of the vanes of this modification is substantially the same as in the previously described embodiment.

While I have herein described and in the drawings shown an illustrative embodiment of the invention, it is understood that the invention is not to be limited thereto but may comprehend other constructions, arrangements of parts, details and features without departing from the spirit of the invention.

It is claimed:

1. A fractionating column or the like, comprising a column having one or more vane assemblies each of which is formed with an annularly arranged series of overlapping trough-like vanes which extend outwardly from adjacent the center of the column, each of said vanes having extended surfaces of different pitch angle intersecting along a line sloping upwardly toward the column wall, the trough of said vanes being on the upper side thereof, a fluid dispersion member provided at the center of said column disposed adjacent the upper edges of the vanes of each assembly, and an annular collar extending inwardly of said column and disposed in spaced axial relation above each of said assemblies.

2. A fractionating column or the like according to claim 1, in which said vanes depend from the fluid dispersion member of each assembly at the periphery thereof and have their upper marginal edge substantially in the plane of said fluid dispersion member.

3. A fractionating column or the like, comprising a column having a series of spaced vane assemblies, each of said vane assemblies having a fluid dispersion member disposed substantially at the center of said column and a plurality of overlapping vanes disposed beneath and extending radially outwardly from said disperison member, each of said vanes being divided into two portions angularly disposed with respect to one another and intersecting along a line sloping generally upwardly and outwardly, one of said portions extending downwardly and outwardly from said line of intersection and the other of said portions extending upwardly and inwardly from said line of intersection, said last mentioned portion having a greater pitch angle than said first mentioned portion, a fluid dispersion member provided at the center of said column disposed adjacent the upper edges of the vanes of each assembly, and an annular collar extending inwardly of said column and disposed in spaced axial relation above each of said assemblies.

4. A fractionating column or the like according to claim 3 in which said vanes depend from the fluid dispersion member of each assembly at the periphery thereof and have their upper marginal edge substantially in the plane of said fluid dispersion member.

5. A fractionating column or the like according to claim 3 in which the first mentioned portion of the vanes has a greater area than the last mentioned portion.

6. A vane assembly for a fractionating column or the like, comprising a top centrally disposed fluid dispersion plate member, and an annularly arranged series of overlapping trough-like vanes in depending associated relation to and extending generally radially outwardly from said plate member, each of said vanes having extended surfaces of different pitch angle intersecting along a line sloping upwardly toward the outer portion of the vane, the trough of said vanes being on the side thereof facing said plate member.

7. A vane assembly for a fractionating column or the like, comprising a top centrally disposed fluid dispersion plate member, and an annularly arranged series of overlapping trough-like vanes in depending associated relation to and extending generally radially outwardly from said plate member, each of said vanes being divided into two portions angularly disposed with respect to one another and intersecting along a line sloping generally upwardly and outwardly to provide a trough on the side facing said plate member, one of said portions extending downwardly and outwardly from said line of intersection and the other of said portions extending upwardly and inwardly from said line of intersection, said last mentioned portion having a greater pitch angle than said first mentioned portion.

8. A vane assembly according to claim 7 in which the first mentioned portion of the vanes has a greater area than the last mentioned portion.

KONRAD F. SCHREIER.
BEN BARTOLUCCI.

REFERENCES CITED

The following references are of record in the file of this patent:

UNITED STATES PATENTS

| Number | Name | Date |
|---|---|---|
| 1,934,674 | Lichtenthaeler | Nov. 7, 1933 |
| 2,114,786 | Schneible | Apr. 19, 1938 |
| 2,409,088 | Weits et al. | Oct. 8, 1946 |

FOREIGN PATENTS

| Number | Country | Date |
|---|---|---|
| 224,714 | Germany | July 29, 1910 |